United States Patent Office 3,125,554
Patented Mar. 17, 1964

3,125,554
INTERPOLYMERS OF ALKENYL SILANES AND OLEFINIC HYDROCARBONS
Glenn D. Cooper and Alfred R. Gilbert, Schenectady, N.Y., assignors to General Electric Company, a corporation of New York
No Drawing. Filed Nov. 25, 1958, Ser. No. 776,189
7 Claims. (Cl. 260—88.1)

This invention is concerned with solid, high molecular weight copolymers derived from a mixture of an alkenyl silane having the formula R—Si(CH$_3$)$_3$ where R is selected from the class consisting of vinyl and allyl radicals and a hydrocarbon having a terminal olefinic linkage. More particularly, the invention is concerned with copolymers of olefinic hydrocarbons copolymerized with either vinyltrimethylsilane or allyltrimethylsilane.

In accordance with our invention, we have found that, by employing a certain catalyst system, we are able to obtain from the above mixtures of the aforesaid alkenyl methylsilanes and the olefinic hydrocarbons, solid polymers, some of which are crystalline and which are useful in making fibers and films having good heat resistance and good electrical insulating characteristics. By varying the proportions of the alkenyl silane and the olefin, one can obtain a wide range of properties varying from soft gums to crystalline, high melting, solid compositions useful in the industrial arts. We are able to obtain solid polymers from mixtures of the copolymerizable monomers where usual free radical polymerization catalysts give liquids or no polymer at all.

Among the olefinic hydrocarbons which may be employed for copolymerization with the vinyltrimethylsilane and the allyltrimethylsilane are those having the formula

where R is either hydrogen or a monovalent hydrocarbon radical selected from the class consisting of alkyl including cycloalkyl radicals (e.g., methyl, ethyl, propyl, butyl, cyclohexyl, etc.); aryl radicals (e.g., phenyl, tolyl, biphenyl, ethylphenyl, etc.); aralkyl radicals (e.g., benzyl, etc.); vinyl radicals, etc. Among such olefinic hydrocarbons are, for instance, ethylene, propylene, n-butene-1, n-pentene-1, styrene, butadiene-1,3, etc.

The polymers derived from the above mixture of the olefinic hydrocarbon and the alkenyl trimethylsilane are obtained by heating the mixture of monomers in the presence of a catalyst system comprising a mixture of an aluminum alkyl (for example, aluminum triethyl, aluminum tributyl, etc.) in combination with a titanium compound advantageously in the form of a halide or salt, e.g., titanium trichloride, titanium tetrachloride, titanium tetraacetate, etc. The amount of catalyst mixture used can be varied within reasonable limits, but advantageously is within the range of from 1 to 20 percent, by weight, based on the weight of the monomers being copolymerized. The mixture of the aluminum alkyl and the titanium compound is preferably within a weight range of from about 0.1 to 5 parts of the aluminum alkyl per part of the titanium compound, for instance, the TiCl$_4$.

The polymerization reaction is advantageously carried out in the presence of a suitable solvent for the monomers. Such a solvent may comprise a liquid hydrocarbon aliphatic solvent such as, for instance, mineral oil, n-heptane, etc.

In carrying out the reaction, the alkenyl trimethylsilane (which hereinafter will be used to designate both the vinyltrimethylsilane and the allyltrimethylsilane) and the olefinic hydrocarbon are dissolved in a suitable solvent, and the mixture heated at temperatures ranging from about 40° to 150° C., and thereafter the titanium compound is added, preferably in the form of a solution in an aliphatic hydrocarbon, for example, n-hexane. After heating the mixture of ingredients for from 1 to 10 or more hours, the copolymer may be precipitated from the solvent by adding to the reaction mixture such materials as methanol and ethanol.

In order that those skilled in the art may better understand the practice of the present invention, the following examples are given by way of illustration and not by way of limitation. All parts are by weight.

*Example 1*

This example describes the preparation of vinyltrimethylsilane. Methyl magnesium bromide was prepared by mixing together 567 grams (23.3 mols) of magnesium turnings in 6 liters of anhydrous diethyl ether and thereafter introducing sufficient methyl bromide. To the Grignard reagent was added 1242 grams (7.76 mols) vinyltrichlorosilane in 1 liter of diethyl ether. Distillation was effected from the reaction mixture to yield about 4 liters of material at which point a solution of 1200 grams of ammonium chloride in 6 liters of water was added to the residue. The ether layer was separated and combined with that which had been distilled. After drying over calcium chloride, the ether solution was subjected to rectification to give 543.7 grams of trimethylvinylsilane boiling at 55° C., and having a refractive index of $n_D^{20}$ 1.3904–1.3908.

*Example 2*

This example illustrates the preparation of allyltrimethylsilane. To 5 mols of methyl magnesium bromide prepared from 121.6 grams of magnesium turnings and 2 liters of anhydrous diethyl ether and methyl bromide, were added 267.4 grams of allyltrichlorosilane and 600 ml. of anhydrous diethyl ether. The reaction mixture was heated to reflux for 1 hour. The reaction flask was fitted for steam distillation and 1 liter of water was added slowly, the heat of hydrolysis causing distillation. The distillation was completed by the introduction of steam. The ether layer of the distillate was separated and dried over calcium chloride. Rectification of the dried ether layer yielded about 138.1 grams of allyltrimethylsilane having a boiling point of 85°–86° C.

Further directions for preparing the vinyltrimethylsilane and the allyltrimethylsilane may be found in Journal of the American Chemical Society, vol. 72, p. 1078 (1950), and in Journal of Organic Chemistry, vol. 17, p. 1379 (1952).

*Example 3*

About 26 grams (0.23 mol) of allyltrimethylsilane, 28 grams (0.4 mol) of n-pentene-1 and 90 ml. of n-heptane were placed in a reaction vessel equipped with a stirrer, reflux condenser and dropping funnel. The flask was swept out with dry nitrogen and thereafter 11.0 ml. of a 25% solution of triethyl aluminum in n-heptane was added. The mixture was heated to 55° C. and 10 ml. of a 10% solution of TiCl$_4$ in n-heptane was added with stirring. The temperature rose rapidly to 62° C., after which the mixture was stirred and heated to about 65° C. for four hours. After cooling the mixture to around room temperature, 100 ml. methanol was added and stirring continued for 10 minutes. The mixture was shaken with 1500 ml. methanol and allowed to remain for about 16 hours, at the end of which time a solid polymeric product was precipitated and removed, dissolved in toluene and reprecipitated by addition of methanol. After drying under vacuum, the polymer was in the form of a solid mass of colorless fibers which could be readily dissolved in benzene and flexible films cast therefrom by evaporation of the solvent. Analysis of this copolymer showed that it was a copolymer containing approximately 30 weight percent of units derived from allyltrimethylsilane, the balance being units derived from n-pentene-1.

Example 4

A solution of 13 grams (0.11 mol) of allyltrimethylsilane in 90 ml. of n-heptane was placed in a reaction vessel equipped with a Dry Ice-cooled reflux condenser. A rapid stream of ethylene was introduced through a tube extending under the surface of the solution. The temperature was increased to 55° C. and 10 ml. of a 25% solution of triethyl alumnium in n-hexane was added, followed by 10 ml. of a 10% solution of titanium tetrachloride in n-heptane. The mixture was then vigorously stirred and the temperature was maintained at 55° C. for two and one-half hours while ethylene was introduced at a rate of about 900-1200 cc. minute. The brownish reaction mixture was cooled to room temperature and 120 ml. of methanol was added. The mixture was filtered and the colorless, granular precipitate was washed with methanol and air-dried to give a solid polymer which upon analysis was shown to be a copolymer of allyltrimethylsilane and ethylene in which 10% of the units were derived from allyltrimethylsilane.

Example 5

A copolymer of vinyltrimethylsilane and ethylene can be prepared similarly as described in Example 4 by passing ethylene through the vinyltrimethylsilane in the presence of the same catalyst system recited in Example 4, and heating in the same manner described in this example. The copolymer can then be precipitated and isolated employing the procedure recited above wherein the units in the copolymer are derived from the ethylene and from the vinyltrimethylsilane.

It will, of course, be apparent to those skilled in the art that other conditions may be employed in making the copolymers of the vinyltrimethylsilane and allyltrimethylsilane. Temperatures of reaction may vary from about 50-150° C. or higher and may be carried out at pressures ranging from somewhat below atmospheric pressure to elevated pressures as high as 5 to 50 atmospheres. The catalyst and catalyst concentration may be varied widely employing the usual so-called "Ziegler" type catalysts which are usually metallic alkyl catalysts in combination with accelerators therefor, such as the titanium tetrachloride employed in the previous examples. The time of heating the mixtures of the alkenyltrimethylsilane and the copolymerizable olefinic hydrocarbon may be varied widely and usually is of the order of about 30 minutes to 10 to 12 hours or more depending on the temperature used, the monomers employed, the particular catalyst system used in the reaction mixture, etc.

The amount of the alkenyl trimethylsilane used with the copolymerizable olefinic hydrocarbon may also be varied widely. Advantageously we employ the copolymerizable monomers within the range of from about 5 to 95 percent of the vinyltrimethylsilane or allyltrimethylsilane to 95 to 5 percent of the other copolymerizable olefinic hydrocarbon.

The compositions of the instant invention, although being thermoplastic in nature, have good heat resistance and thus have many uses. These copolymers can be molded to give sheets which have good strength which can be employed for slot liners in motor insulation. In addition, some of the polymers, especially those which are crystalline, may be extruded from a melt or from a solution to give fibers which can be oriented to yield filaments of good strength. Alternatively, the copolymers can be dissolved in a suitable solvent and electrical metallic conductors can be passed through such solutions and heated to remove solvent to give insulated conductors which have good electrical properties and good flexibility. The copolymers are especially suitable for insulation purposes because of their good electrical characteristics.

The copolymers of our invention can be treated with strong acids, such as sulfuric acid, aluminum chloride and HCl, etc., to cleave some of the Si—C bonds and substitute a hydrolyzable group on the silicon, for instance, chlorine, the sulfate radical, etc. These hydrolyzable polymeric silicon compositions can then be cohydrolyzed with other organochlorosilanes or equilibrated with organopolysiloxanes to give block copolymers containing polysiloxane units and units derived from our described copolymers, such block polymers having segments in which the polymer chain is composed of C—C linkages and other segments composed of Si—O—Si linkages.

It will, of course, be apparent to those skilled in the art that our above-identified compositions can be mixed with various other materials including various fillers (e.g., silica, carbon black, titanium dioxide, diatomaceous earth, etc.), plasticizers, pigments, stabilizers (both heat and light stabilizers, etc.).

What we claim as new and desire to secure by Letters Patent of the United States is:

1. A solid copolymer of (1) from 5 to 95 percent, by weight, of a monomeric alkenylsilane selected from the class consisting of vinyltrimethylsilane and allyltrimethylsilane and (2) from 95 to 5 percent, by weight, of a copolymerizable olefinic hydrocarbon having the formula

where R is selected from the class consisting of hydrogen and monovalent hydrocarbon radicals.

2. A solid copolymer of from 5 to 95 percent, by weight of allyltrimethylsilane and from 95 to 5 percent, by weight of ethylene.

3. A solid copolymer of from 5 to 95 percent, by weight, of allyltrimethylsilane and from 95 to 5 percent, by weight, of n-pentene.

4. The process for polymerizing to a solid high molecular weight composition a mixture of ingredients comprising (1) from 5 to 95 percent, by weight, of a monomeric alkenylsilane selected from the class consisting of vinyltrimethylsilane and allyltrimethylsilane and (2) from 95 to 5 percent, by weight, of a copolymerizable olefinic hydrocarbon having the formula

where R is selected from the class consisting of hydrogen and monovalent hydrocarbon radicals, which process comprises heating the aforesaid mixture of ingredients in the presence of a solvent and a mixed catalyst system composed of an aluminum trialkyl and a titanium compound selected from the class consisting of titanium halides and titanium salts.

5. The process as in claim 4 in which the copolymerizable monomers comprise allyltrimethylsilane and ethylene.

6. The process as in claim 4 in which the copolymerizable monomers comprise allyltrimethylsilane and n-pentene-1.

7. The process as in claim 4 in which the aluminum trialkyl is aluminum triethyl and the titanium compound is titanium tetrachloride.

References Cited in the file of this patent

UNITED STATES PATENTS

| | | |
|---|---|---|
| 2,448,391 | Pyle | Aug. 31, 1948 |
| 2,642,415 | Winslow | June 16, 1953 |
| 2,846,427 | Findlay | Aug. 5, 1958 |
| 2,894,922 | Olson et al. | July 14, 1959 |
| 2,910,461 | Nowlin et al. | Oct. 27, 1959 |
| 2,943,063 | Eby et al. | June 28, 1960 |
| 2,958,681 | Campbell | Nov. 1, 1960 |

OTHER REFERENCES

Bessant et al.: "Reports on the Progress of Applied Chemistry," volume 42 (1957), pages 422–441.

Natta et al.: "Journal of Polymer Science," volume 31, No. 122, August 1958, pages 181–183.

Scott et al.: J.A.C.S., volume 81, June 1959, pages 2670–72.